UNITED STATES PATENT OFFICE.

THOMAS SPENCER, OF SYRACUSE, NEW YORK.

IMPROVEMENT IN THE MANUFACTURE OF COMMON SALT.

Specification forming part of Letters Patent No. 30,165, dated September 25, 1860; Reissue No. 1,291, dated March 18, 1862.

*To all whom it may concern:*

Be it known that I, THOMAS SPENCER, of Syracuse, in the county of Onondaga and State of New York, have invented a new and useful Improvement in Rendering Salt Free from the Deliquescent Properties Found in the Ordinary Salt of Commerce; and I do hereby declare and ascertain my said invention, as follows:

Heretofore I have received Letters Patent for the employment of the carbonate of soda or the bicarbonate, which makes a very pure article of salt. In my present discovery I propose to employ the sulphate of soda of commerce mixed with the common salt, or a mixture of sulphuric acid with the common salt to be purified.

The method employed by me to render the common salt free from deliquescent impurities is adding thereto a quantity of sulphate of soda or sulphuric acid, as above named, equivalent to the determined amount of impurities, consisting of the chloride of calcium or magnesium in said common salt after it has been crystallized and the mother-liquor properly drained therefrom in the usual way after evaporation in the pans.

The application of the sulphate of soda or its equivalent, as above stated, to the drained salt may be made in any convenient way found most efficient and cheap, which can be determined by the manufacturer and suited to the position and construction of the works.

I am aware that sulphuric acid and sulphate of soda have both been used, mixed with the brine or mother-water before crystallization, for the purpose of neutralizing the chlorides, &c.; but that method of using them is wasteful and expensive, and cannot be profitably employed in the manufacture of non-deliquescent salt for commercial purposes.

I do not claim uniting the chemicals herein named with crystallized salt by fusing them together, or with salt before it is freed from the bath, as these processes have before been essayed, but were found too expensive for commercial purposes.

Having thus fully set forth my discovery and improvement in the process of making salt, so as to free it from its deliquescent properties, what I claim, and desire to secure by Letters Patent, is—

The admixture of sulphate of soda or its equivalent, as above set forth, with common salt in a crystallized state, after being removed from the impure bath or "mother-liquor," for the purposes herein specified.

THOMAS SPENCER.

Witnesses:

J. J. GREENOUGH,

D. ROWLAND.